US012749037B2

(12) United States Patent
Ruble et al.

(10) Patent No.: US 12,749,037 B2
(45) Date of Patent: Sep. 29, 2026

(54) SYSTEMS AND METHODS FOR ROLE BASED KNOWLEDGE GRAPH VISUALIZATIONS OF SOURCE DATA FILES

(71) Applicant: Wells Fargo Bank, N.A., San Francisco, CA (US)

(72) Inventors: Matthew R. Ruble, Malvern, PA (US); Eric Bruce Standring, San Francisco, CA (US); David Newman, Walnut Creek, CA (US); Chao Chen, Short Hills, NJ (US); Steven Daryl McCullough, Ithaca, NY (US); Omar B. Khan, Richmond, VA (US); Nikolai Anisimov, Brentwood, CA (US); Cristian Cocos, Princeton, NJ (US); Nisha Rama Krishnan, Concord, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 493 days.

(21) Appl. No.: 18/315,092

(22) Filed: May 10, 2023

(65) Prior Publication Data

US 2024/0378537 A1 Nov. 14, 2024

(51) Int. Cl.

| | |
|---|---|
| ***G06Q 10/0637*** | (2023.01) |
| ***G06F 3/04817*** | (2022.01) |
| ***G06N 5/02*** | (2023.01) |

(52) U.S. Cl.

CPC ... *G06Q 10/06375* (2013.01); *G06F 3/04817* (2013.01); *G06N 5/02* (2013.01)

(58) Field of Classification Search

CPC . G06Q 10/06375; G06F 3/04817; G06N 5/02

See application file for complete search history.

(56) References Cited

U.S. PATENT DOCUMENTS

| | | | |
|---|---|---|---|
| 9,031,994 | B1 | 5/2015 | Cao et al. |
| 10,452,975 | B2 | 10/2019 | Jacob et al. |

(Continued)

FOREIGN PATENT DOCUMENTS

| | | |
|---|---|---|
| CA | 3035213 | 8/2020 |
| CN | 113836310 | 12/2021 |

OTHER PUBLICATIONS

Wongsuphasawat et al., "Visualizing Dataflow Graphs of Deep Learning Models in TensorFlow," in IEEE Transactions on Visualization and Computer Graphics, vol. 24, No. 1, pp. 1-12, Jan. 2018 (Year: 2018).*

(Continued)

*Primary Examiner* — Amber A Misiaszek

(74) *Attorney, Agent, or Firm* — SCHWEGMAN LUNDBERG & WOESSNER, P.A.

(57) ABSTRACT

A method may include receiving a login request including a user identifier; accessing a role in a user account associated with the user identifier; presenting a user interface, the user interface including: a service receiver input element presenting a selected service receiver; a service identifier input element presenting a selected service identifier; a graph presentation area; and graph visualization options based on the role in the user account; executing a knowledge graph database query to a knowledge graph database using a combination of the selected service receiver and the selected service identifier; and generating, in the graph presentation area an interactive graph based on tuple results of the knowledge graph database query, the interactive graph including: representations of entities in the tuple results including the selected service receiver and the selected service identifier; and links connecting the representations of entities.

14 Claims, 9 Drawing Sheets

(56) References Cited

U.S. PATENT DOCUMENTS

| | | | |
|---|---|---|---|
| 10,614,086 | B2 | 4/2020 | Tung et al. |
| 10,977,603 | B2 | 4/2021 | Katsoulakos et al. |
| 10,997,244 | B2 * | 5/2021 | Russell ................... G06F 16/27 |
| 11,238,084 | B1 * | 2/2022 | Newman ............... G06F 16/334 |
| 12,420,396 | B2 | 9/2025 | Suarez |
| 2013/0013645 | A1 | 1/2013 | Dias et al. |
| 2016/0274938 | A1 | 9/2016 | Calvanese Strinati et al. |
| 2017/0039500 | A1 * | 2/2017 | Leidner .............. G06Q 10/0833 |
| 2017/0364570 | A1 | 12/2017 | Jacob et al. |
| 2017/0371881 | A1 | 12/2017 | Reynolds et al. |
| 2018/0126527 | A1 | 5/2018 | Pomeroy et al. |
| 2018/0126529 | A1 | 5/2018 | Pomeroy et al. |
| 2018/0126530 | A1 | 5/2018 | Pomeroy et al. |
| 2019/0303871 | A1 | 10/2019 | Katsoulakos et al. |
| 2020/0081931 | A1 | 3/2020 | Hirmer et al. |
| 2020/0120109 | A1 * | 4/2020 | Shu ..................... H04L 63/1425 |
| 2020/0272989 | A1 | 8/2020 | Katsoulakos et al. |
| 2021/0173711 | A1 | 6/2021 | Crabtree et al. |
| 2021/0182995 | A1 | 6/2021 | Cella et al. |
| 2021/0216881 | A1 | 7/2021 | Mccarthy et al. |
| 2021/0224929 | A1 | 7/2021 | Bajaj et al. |
| 2021/0299835 | A1 | 9/2021 | Ward et al. |
| 2021/0299837 | A1 | 9/2021 | Garces et al. |
| 2021/0304044 | A1 | 9/2021 | Nagarajan et al. |
| 2021/0347022 | A1 | 11/2021 | Leathrum et al. |
| 2021/0379747 | A1 | 12/2021 | Mikat-stevens |
| 2022/0044204 | A1 | 2/2022 | Cella et al. |
| 2022/0134525 | A1 | 5/2022 | Bandy et al. |
| 2022/0229400 | A1 | 7/2022 | Soler Garrido et al. |
| 2023/0122029 | A1 | 4/2023 | Bierdeman et al. |
| 2023/0237271 | A1 * | 7/2023 | Ferrucci ................. G16H 70/60 707/726 |
| 2023/0264332 | A1 | 8/2023 | Neuhoff et al. |
| 2023/0302618 | A1 | 9/2023 | Nettleton et al. |
| 2023/0350931 | A1 | 11/2023 | Lewis et al. |
| 2023/0376496 | A1 | 11/2023 | Jacob et al. |
| 2024/0121074 | A1 | 4/2024 | Adir et al. |
| 2024/0296080 | A1 | 9/2024 | Portisch et al. |
| 2024/0316737 | A1 | 9/2024 | Garces et al. |
| 2024/0330645 | A1 | 10/2024 | Oltramari |
| 2024/0367297 | A1 | 11/2024 | Neuhoff et al. |
| 2024/0378176 | A1 | 11/2024 | Newman et al. |
| 2024/0378461 | A1 | 11/2024 | Newman et al. |

OTHER PUBLICATIONS

Boxtel, L. Van, “Supporting decision making in a complex supply chain environment using a virtual knowledge graph”, Sep. 2020, Eindhoven University of TechnologyThesis, (Sep. 30, 2020), 93 pgs.

Zhang, Wanyue, “The Construction of a Domain Knowledge Graph and Its Application in Supply Chain Risk Analysis”, K.-M. Chao et al. (Eds.): ICEBE 2019, LNDECT 41, pp. 464-478, 2020.https: doi.org 10.1007978-3-030-34986-8_33, (Nov. 28, 2019), 15 pgs.

U.S. Appl. No. 18/315,080, filed May 10, 2023, Systems and Methods for Data Transaltion of Source Data Files.

U.S. Appl. No. 18/315,083, filed May 10, 2023, User Interfaces for Navigation of Knowledge Graph Source Data.

“U.S. Appl. No. 18/315,080, Non Final Office Action mailed Sep. 19, 2024”, 20 pgs.

“U.S. Appl. No. 18/315,080, Examiner Interview Summary mailed Dec. 17, 2024”, 3 pgs.

“U.S. Appl. No. 18/315,080, Response filed Dec. 19, 2024 to Non Final Office Action mailed Sep. 19, 2024”, 11 pgs.

“U.S. Appl. No. 18/315,080, Notice of Allowance mailed Mar. 12, 2025”, 10 pgs.

“U.S. Appl. No. 18/315,080, Corrected Notice of Allowability mailed Mar. 26, 2025”, 2 pgs.

Keshavarzi, Abbas, “KGdiff: Tracking the Evolution of Knowledge Graphs”, IEEE 21st International Conference on Information Reuse and Integration for Data Science (IRI), Las Vegas, NV, USA, (Aug. 1, 2020), 279-286.

“U.S. Appl. No. 18/315,083, Non Final Office Action mailed Mar. 4, 2026”, 11 pgs.

* cited by examiner

SYSTEMS AND METHODS FOR ROLE BASED KNOWLEDGE GRAPH VISUALIZATIONS OF SOURCE DATA FILES

Companies may have many subsidiaries and interact with thousands of services. In order to keep track of what services are being provided to which subsidiary a spreadsheet may be used. The spreadsheet may identify other information about a subsidiary or service such as its location, in various examples.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
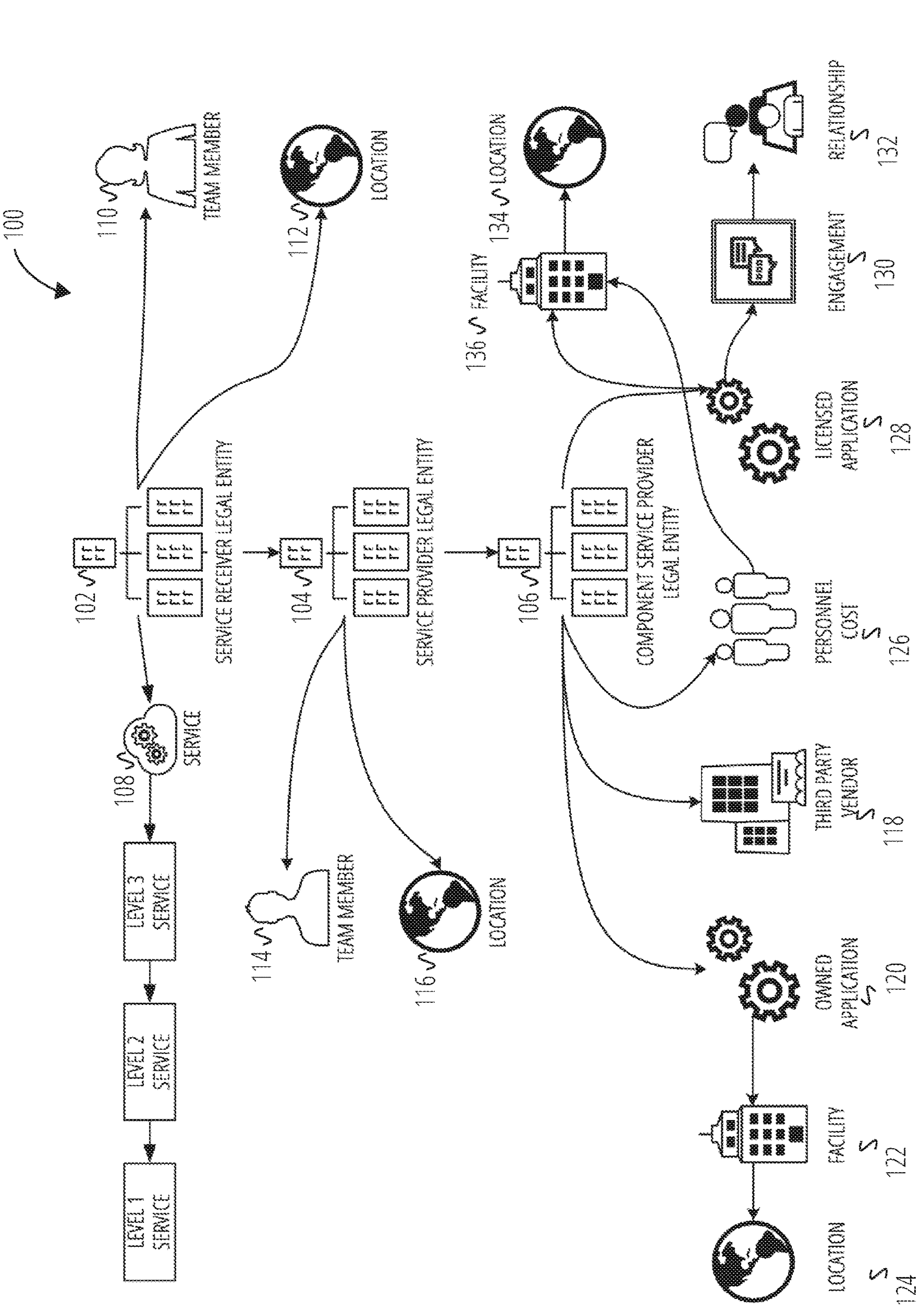
FIG. 1 is an entity link visualization diagram, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

An enterprise (e.g., a company) may have many sub-entities that operate under a main entity. For example, Acme Inc., may have a subsidiary, Little Acme., Inc. For large enterprises there may be hundreds of such entities. An entity may provide services or receive services (sometimes both). A service provider may also use other companies to provide portions of the services, which may be called component service providers. The failure of one of the component service providers may have a ripple effect that causes one or more entities of the enterprise to fail (e.g., become unable to perform its functions).

In addition to the problems that may be associated with a service not working, many enterprises are under regulatory rules to maintain their respective functions. Not all entities may be under such rules. Accordingly, some services may be designated as critical. As an extension, service providers and component service providers that support those critical service receivers may also need to be of a higher caliber nature with more robust uptime requirements and may be designated as material.

One possible solution may be a manual spreadsheet that attempts to manage the linkages between service providers, service receivers, and component service providers. This approach has several problems, however, including data integrity, data scalability, and data security. For example, spreadsheets are prone to human error, such as incorrect data entry, accidental deletion, or modification of data. This can lead to inconsistencies in the data and make it difficult to trust and make decisions based on the information in the spreadsheet. Additionally, not all spreadsheets are designed to efficiently handle and run complex analysis on large amounts of data. As the number of legal entities (e.g., service providers and service receivers) and relationships between them increases, the spreadsheet can become unwieldy and difficult to navigate. This may make it hard to find the information needed or to get a clear overview of the data unless the person that created the spreadsheet is readily available.

In addition to the data storage issues, spreadsheets may not have the tools for proper data analysis and visualization. Thus, it may be time-consuming and difficult to extract meaningful insights from the data in a spreadsheet. Similarly, spreadsheets are not often designed to link data across different sheets or workbooks-especially if those spreadsheets are not always network accessible and in disparate physical locations. This may make it difficult to connect related data and trace relationships between legal entities, which may be important when dealing with complex relationship structures and critical services.

Accordingly, a more robust, accurate, and efficient system for tracking linkages between service providers, service receivers, and component service providers is needed. By using a different data structure, such as a knowledge graph-which is designed to handle large amounts of data and semantically link and analyze data-many of these issues may be mitigated. This may make it much easier to manage and understand the relationships between legal entities in a business for compliance, risk management and decision-making.

FIG. 1 is an entity link visualization diagram, according to various examples. FIG. 1 includes concepts of a service receiver legal entity 102, a service provider legal entity 104, a component service provider legal entity 106, a service 108, a team member 110, a location 112, a team member 114, a location 116, a third party vendor 118, an owned application 120, a facility 122, a location 124, a personnel cost 126, a licensed application 128, an engagement 130, a relationship 132, a location 134, and a facility 136.

The diagram in FIG. 1 may be an abstracted conceptual visualization of data linkages in a semantic ontology. The semantic ontology may be considered a chain source ontology in various examples. The precise names and linkages shown are an example and other names and linkages may be used. A semantic ontology may be a hierarchy of concepts. A concept may have one or more properties and each property may have a value type (e.g., string, number, another concept, etc.). At a high level, a semantic ontology allows for generating triples that use a subject-predicate-object (SPO) triple to define the relationships between the concepts. The triples may be defined in a standardized format specification such as the resource description framework (RDF). The subject, object, and predicate may be a uniform resource identifier (URI), a value, or resource.

For example, a triple may be:

<(website)/legalentity/serviceprovider#entityname>
<(website)/legalentity/serviceprovider#location> "123 Main St."

The above triple may be representative of the SPO triple of entity name has a location of "123 Main St". With reference to FIG. 1, service receiver legal entity 102 may be a service provider concept of the triple and location 112 may be the location concept. An extension of RDF is an RDF schema (RDFS), and relatedly the Web Ontology Language (OWL). These define additional syntax vocabularies to allow for more complex relationship definitions for concepts such as classes, subclasses, inheritance, etc. Furthermore, one semantic ontology may link to another entity or import the classes of another base ontology-thereby extending the base ontology.

Entity link visualization 100 may represent the topology of a service network. As seen, service receiver legal entity 102 may receive service 108. Service receiver legal entity 102 (and service provider legal entity 104) may additionally have one (or more) associated team member 110 entities and location 112 or location 116. A team member entity may correspond to an employee identifier and a location may be an address, in various examples. Service receiver legal entity 102, service provider legal entity 104, and component service provider legal entity 106 may have respective values (not shown) that correspond to the formal legal name of a business entity. Service provider legal entity 104 may be a business entity that provides service 108 to service receiver legal entity 102, and component service provider legal entity 106 may be the business entity that provides a component for service 108 to service provider legal entity 104.

Component service provider legal entity 106 may be associated with many different entities. For example, component service provider legal entity 106 may have an owned application 120 (e.g., an application developed and maintained by the entity) or licensed application 128 (e.g., a third-party application). Either type of application may be hosted by a facility (e.g., facility 122 and facility 136), which in turn have their own locations (e.g., location 124 and location 134). In the instances of licensed application 128 there may be an entity (e.g., engagement 130) of how component service provider legal entity 106 is engaged (a type of agreement) with licensed application 128 with a subclass of relationship 132. In some examples, component service provider legal entity 106 may utilize a third-party vendor 118. Another entity may store a value of personnel cost 126 (e.g., a percentage of available employee bandwidth/productivity) with respect to component service provider legal entity 106 for service provider legal entity 104.

As indicated above, ontologies may be interconnected. In various examples, the service network ontology as depicted in FIG. 1 may utilize links to a language and country code ontology. Furthermore, it may import (and thus make use of) a corporation specific ontology, which in turn may have imported a subject-matter specific (e.g., medical, financial, educational, etc.) ontology.

Figure 2:
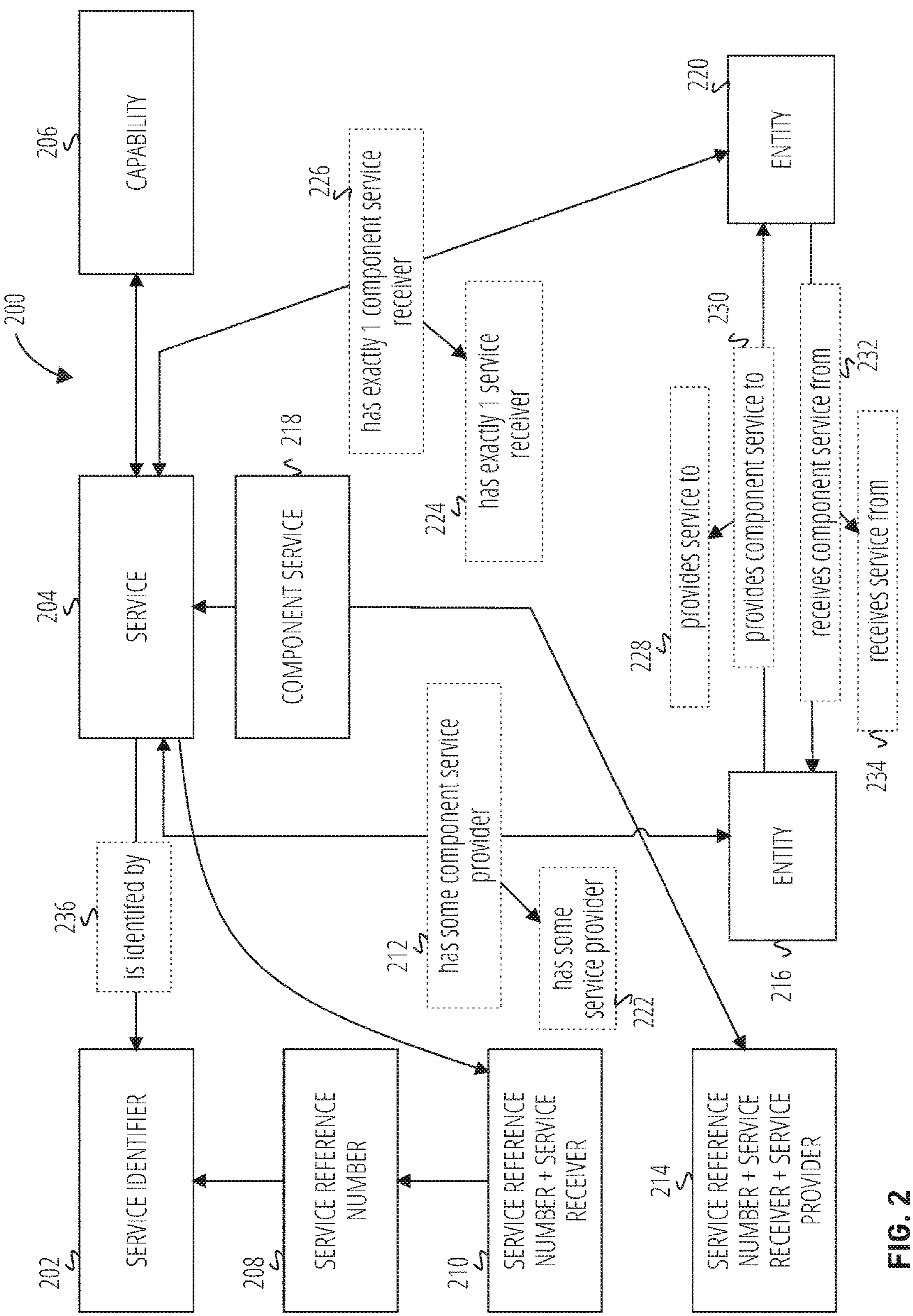
FIG. 2 is a visual representation of an ontology schema, according to various examples.

FIG. 2 is a visual representation 200 of an ontology schema, according to various examples. FIG. 2 is presented as a subset of a chain source ontology and includes objects 202 to 220 and properties 222 to 236. For example, service object 204 may have a property (property 236) of "is identified by" service identifier object 202. Thus, a triple within a knowledge graph may be of the form <service object, is identified by, service identifier object>.

Furthermore, some of the links the visual representation 200 are unlabeled. In these instances, it may be assumed there is "has a" property relationship. For example, service receiver object 208 may have a service identifier object 202 and component object 218 may have an object 214. It may also be seen that properties may also link or be associated with other properties. For example, property 226, which links service object 204 and entity object 220 has its own property 224. The precise descriptions and links in visual representation 200 are an example, and other layouts and property labels may be used.

Figure 3:
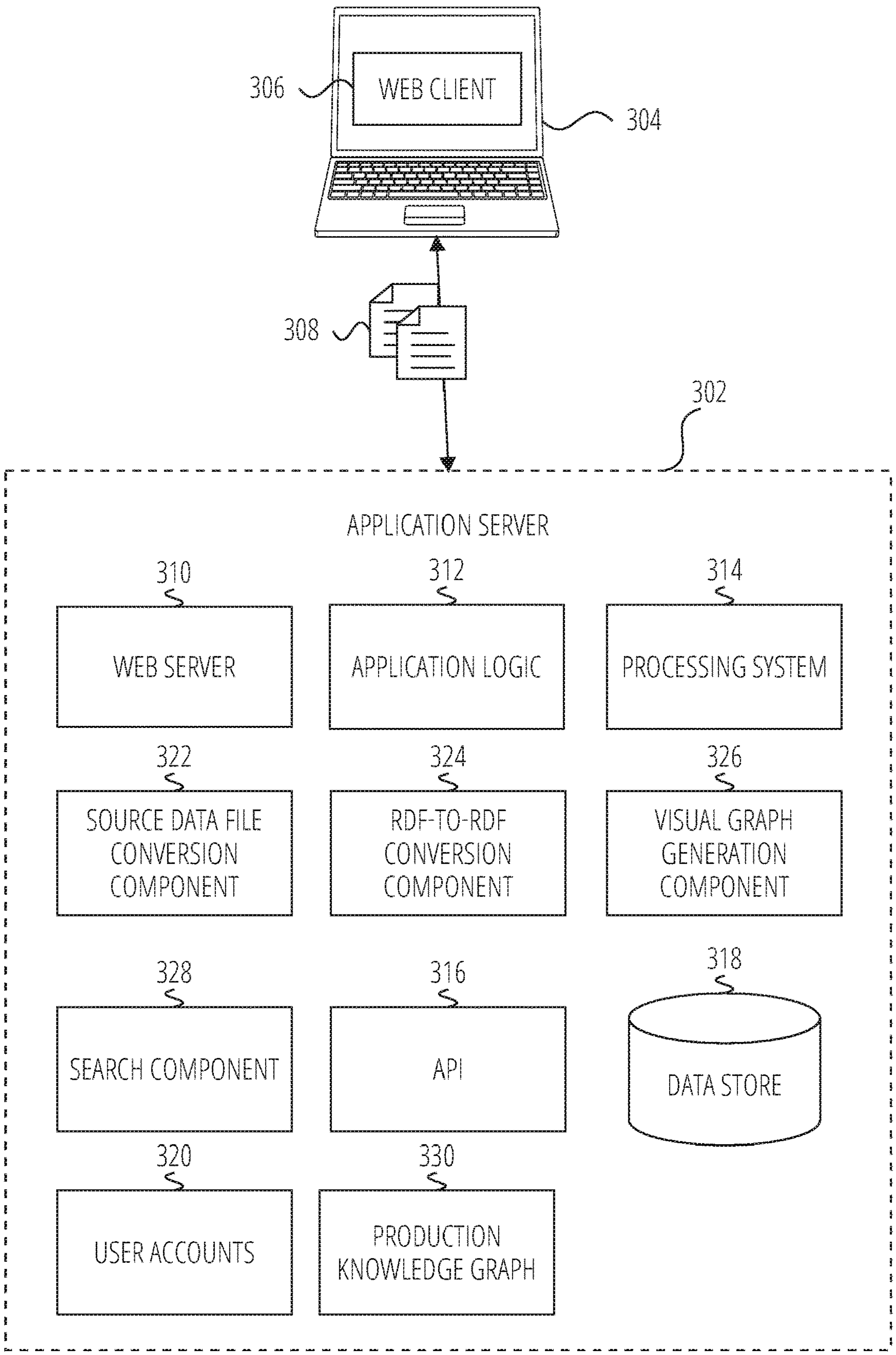
FIG. 3 is an illustration of components of a client device and knowledge graph application server, according to various examples.

FIG. 3 is an illustration of components of a client device and knowledge graph application server, according to various examples. FIG. 3 includes a knowledge graph application server 302, a client device 304, a web client 306, a data 308, a web server 310, an application logic 312, a processing system 314, an API 316, a data store 318, a user accounts 320, a source data file conversion component 322, an RDF-to-RDF conversion component 324, a visual graph generation component 326, a search component 328, and a production knowledge graph 330.

Knowledge graph application server 302 is illustrated as set of separate elements (e.g., components, etc.). However, the functionality of multiple, individual elements may be performed by a single element. An element may represent computer program code that is executable by processing system 314. The program code may be stored on a storage device (e.g., data store 318) and loaded into a memory of the processing system 314 for execution. Portions of the program code may be executed in a parallel across multiple processing units (e.g., a core of a general-purpose computer processor, a graphical processing unit, an application specific integrated circuit, etc.) of processing system 314. Execution of the code may be performed on a single device or distributed across multiple devices. In some examples, the program code may be executed on a cloud platform (e.g., MICROSOFT AZURE® and AMAZON EC2®) using shared computing infrastructure.

Furthermore, several functions are discussed as being performed on knowledge graph application server 302 such as data ingestion, data processing, graph manipulations, visualizations, etc. As with the individual elements, these functions may be performed by one or more other servers. For example, one server may primarily be used for responding to visualization requests and another server may primarily be used for responding to database queries.

Client device 304 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

A user may use a device such client device 304 for a variety of purposes with respect to knowledge graph application server 302. For example, a data scientist may use client device 304 to edit an ontology (e.g., add properties of concept types, add new concepts, etc.). Another user may use client device 304 to query production knowledge graph 330 for a service and see the potential impact on an enterprise should the service go down. Yet another user may use client device 304 to look at inferred relationship between server receivers and service providers. Other use cases may be determined by a person having ordinary skill in the art upon review of this disclosure.

Client device 304 and knowledge graph application server 302 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In some examples, the communication may occur using an application programming interface (API) such as API 316. An API provides a method for computing processes to exchange data. A web-based API (e.g., API 316) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 318). For example, a user may activate a user interface (UI) element to initiate a search on a particular service receiver. In response, an API call may be generated that includes a JavaScript Object Notation (JSON) payload with a service receiver identifier. Knowledge graph application server 302 may receive the API call and, using search component 328, generate and issue a query to data store 318 for information on the service receiver and transmit the query results back to client device 304 for display.

Knowledge graph application server 302 may include web server 310 to enable data exchanges with client device 304 via web client 306. Although generally discussed in the context of delivering webpages via the Hypertext Transfer Protocol (HTTP), other network protocols may be utilized by web server 310 (e.g., File Transfer Protocol, Telnet, Secure Shell, etc.). A user may enter in a uniform resource identifier (URI) into web client 306 (e.g., the INTERNET EXPLORER® web browser by Microsoft Corporation or SAFARI® web browser by Apple Inc.) that corresponds to the logical location (e.g., an Internet Protocol address) of web server 310. In response, web server 310 may transmit a web page that is rendered on a display device of a client device (e.g., a mobile phone, desktop computer, etc.).

Additionally, web server 310 may enable a user to interact with one or more web applications provided in a transmitted web page. A web application may provide user interface (UI) components that are rendered on a display device of client device 304. The user may interact (e.g., select, move, enter text into) with the UI components, and, based on the interaction, the web application may update one or more portions of the web page. A web application may be executed in whole, or in part, locally on client device 304. The web application may populate the UI components with data from external sources or internal sources (e.g., data store 318) in various examples. In various examples, the web application is a dynamic user interface that provides several ways to view and analyze data stored in production knowledge graph 330. These views and associated functionality are described in more detail with respect to the remaining figures.

The web application may be executed according to application logic 312. Application logic 312 may use the various elements of knowledge graph application server 302 to implement the web application. For example, application logic 312 may issue API calls to retrieve or store data from data store 318 and transmit it for display on client device 304. Similarly, data entered by a user into a UI component may be transmitted using API 316 back to the web server. Application logic 312 may use other elements (e.g., source data file conversion component 322, RDF-to-RDF conversion component 324, visual graph generation component 326, etc.) of knowledge graph application server 302 to perform functionality associated with the web application as described further herein.

Data store 318 may store data that is used by knowledge graph application server 302, such as production knowledge graph 330 and user profile of user accounts 320. Data store 318 is depicted as singular element but may in actuality be multiple data stores. The specific storage layout and model used in by data store 318 may take a number of forms-indeed, a data store 318 may utilize multiple models. Data store 318 may be, but is not limited to, a relational database (e.g., SQL), non-relational database (NoSQL) a flat file database, object model, document details model, graph database, shared ledger (e.g., blockchain), or a file system hierarchy. Data store 318 may store data on one or more storage devices (e.g., a hard disk, random access memory (RAM), etc.). The storage devices may be in standalone arrays, part of one or more servers, and may be located in one or more geographic areas.

User accounts 320 may include user profiles on users of knowledge graph application server 302. A user profile may include credential information such as a username and hash of a password. A user may enter in their username and plaintext password to a login page of knowledge graph application server 302 to view their user profile information or interfaces presented by knowledge graph application server 302 in various examples.

A user account may also include preferences of the user. The preferences may include default views and default graph visualization options. For example, a user may set the default levels (e.g., the number of links to follow down a graph database) of a visualization to three and the view to be a service receiver network view. The user account may also identify a role of the user. Different users may have different access rights with respect to data stored in production knowledge graph 330. For example, a data scientist may be able to edit a schema of an ontology, another user may be able to view service receiver links, but not view information on what service providers are considered material (discussed in more detail below).

Figure 4:
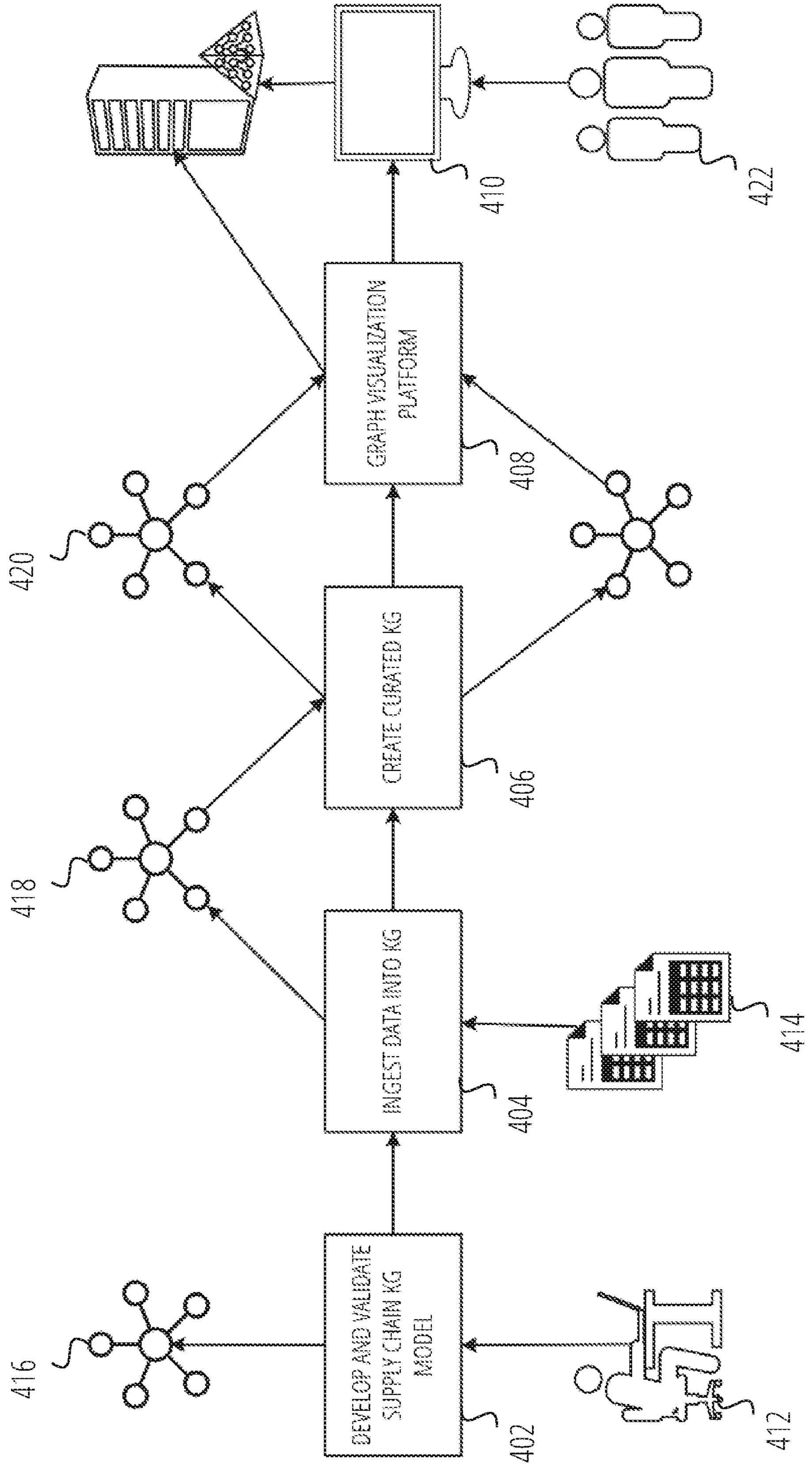
FIG. 4 is a process diagram of generating a knowledge graph database, according to various examples.

FIG. 4 is a process diagram of generating a knowledge graph database, according to various examples. FIG. 4 is illustrated as including a develop and validate operation 402, an ingestion operation 404, a curate graph operation 406, a visualization platform 408, a display device 410, data scientist users 412, input data sources 414, a chain source ontology 416, a raw chain source graph 418, a curated chain source graph 420, and end users 422. The operations described with respect to FIG. 4 may be performed by a computing device such as knowledge graph application server 302. For example, ingestion operation 404 may be performed by source data file conversion component 322, curate graph operation 406 may be performed by RDF-to-RDF conversion component 324, and the visualization platform 408 may be implemented by visual graph generation component 326.

As an initial matter, data scientist users 412 may generate a schema, referred to herein as chain source ontology 416. Chain source ontology 416 may be generated in several formats. A schema for an ontology is a set of rules and guidelines that define the structure, content, and relationships of the classes, properties, and individuals (e.g., people, businesses, objects) in the ontology. The schema may provide a formal specification of the ontology that may be used to guide the development, maintenance, and use of the ontology by different stakeholders and applications. For example, the schema may describe the concepts in FIG. 1.

The schema for an ontology may be expressed in various ways. For example, in OWL, the schema for an ontology may be expressed using OWL constructs, such as class and property axioms, restrictions, and annotations. In RDF, the schema for an ontology may be expressed using RDF vocabularies, such as RDFS (RDF Schema) and OWL, and may include definitions of classes, properties, and datatypes, as well as other metadata and documentation. Within the context of chain source ontology 416, the schema may identify the various classes such as a service receiver, service provider, component service provider and relationships between such classes. The schema may be based in part on an existing data source (e.g., input data sources 414) such as column headings in a spreadsheet or tables of a relational database. As an example, here is what a Person class and an Organization class may approximately look like in OWL:

```
Class: ex: Person
  SubClassOf: owl: Thing
  EquivalentTo:
    hasFirstName some xsd: string
    hasLastName some xsd: string
Class: ex: Organization
  SubClassOf: owl: Thing
  EquivalentTo:
    hasName some xsd: string
    hasAddress some ex: Address
    hasEmployee only ex: Person
ObjectProperty: ex: hasEmployee
  Domain: ex: Organization
  Range: ex: Person
```

Ingestion operation 404 may convert the data in input data sources 414 to raw chain source graph 418. Depending on the format of input data sources 414, different algorithms may be executed by source data file conversion component 322. For example, if an input source is a spreadsheet in an XLS format, XLS2RDF may be used whereas if an input source is a relational database table, SQL2RDF may be used.

Input data sources 414 may include one or more spreadsheets that include data identifying properties and links between services, providers, and receivers. The spreadsheets may include several columns. For example, a portion of the spreadsheets may be for service providers and include columns such as "Provider Legal Entity ID" and "Provider Legal Entity Name." A service receiver portion may have columns for "Receiver Legal Entity ID" and "Receiver Legal Entity Name." Many more columns may be in the spreadsheet that identify locations of the service receivers and service providers and relationship types of the service providers (e.g., inter-company relationship, external relationship, etc.). Service information may also be included in the spreadsheets and include a "Service ID" column and whether or not the service is considered critical, and associated information for each legal entity (e.g., location, identifiers, etc.). Accordingly, if one were to read a row it may be determined that for a given service ID, there is a provider legal entity and a receiver legal entity, and component service providers.

The resulting raw chain source graph 418 after ingestion operation 404 may be a graph database that is full of triples based on the data in input data sources 414. The data may be considered raw as it does not yet conform to the chain source ontology 416. Instead, the identification of objects in raw chain source graph 418 may be based on the column headings in input data sources 414. Accordingly, if a heading was "SR_ID" for service receiver ID and "SR_NM" for the service receivers legal name a property may be <SR_ID, has a, SR_NM>. While this may be technically correct, SR_ID may not appear in chain source ontology 416. Accordingly, a further operation (e.g., curate graph operation 406) may be used to translate raw chain source graph 418 to curated chain source graph 420.

For example, RDF2RDF scripts may be executed that include mappings between the object types, properties, etc., used in raw chain source graph 418 to the chain source ontology 416. Accordingly, triples that conform to chain source ontology 416 may be generated based on the triples in raw chain source graph 418. Furthermore, not all of the data that is in raw chain source graph 418 may be needed in curated chain source graph 420. Accordingly, the scripts may also specify what data to map and what data to ignore. Thus, the resulting curated chain source graph 420 may conform to chain source ontology 416 and be smaller in size (e.g., in data) than raw chain source graph 418 thereby saving storage space and increasing the speed of querying.

Curated chain source graph 420 may be used by visualization platform 408 to respond to queries and generate graph visualizations for client devices. For example, end users 422 may login to visualization platform 408 and request the service provider for a service. Visualization platform 408 may query curated chain source graph 420 and generate a graph visualization for display device 410. The process of querying and generating the visualizations is discussed in the context of other figures of this disclosure (see e.g., FIG. 6).

Figure 5:
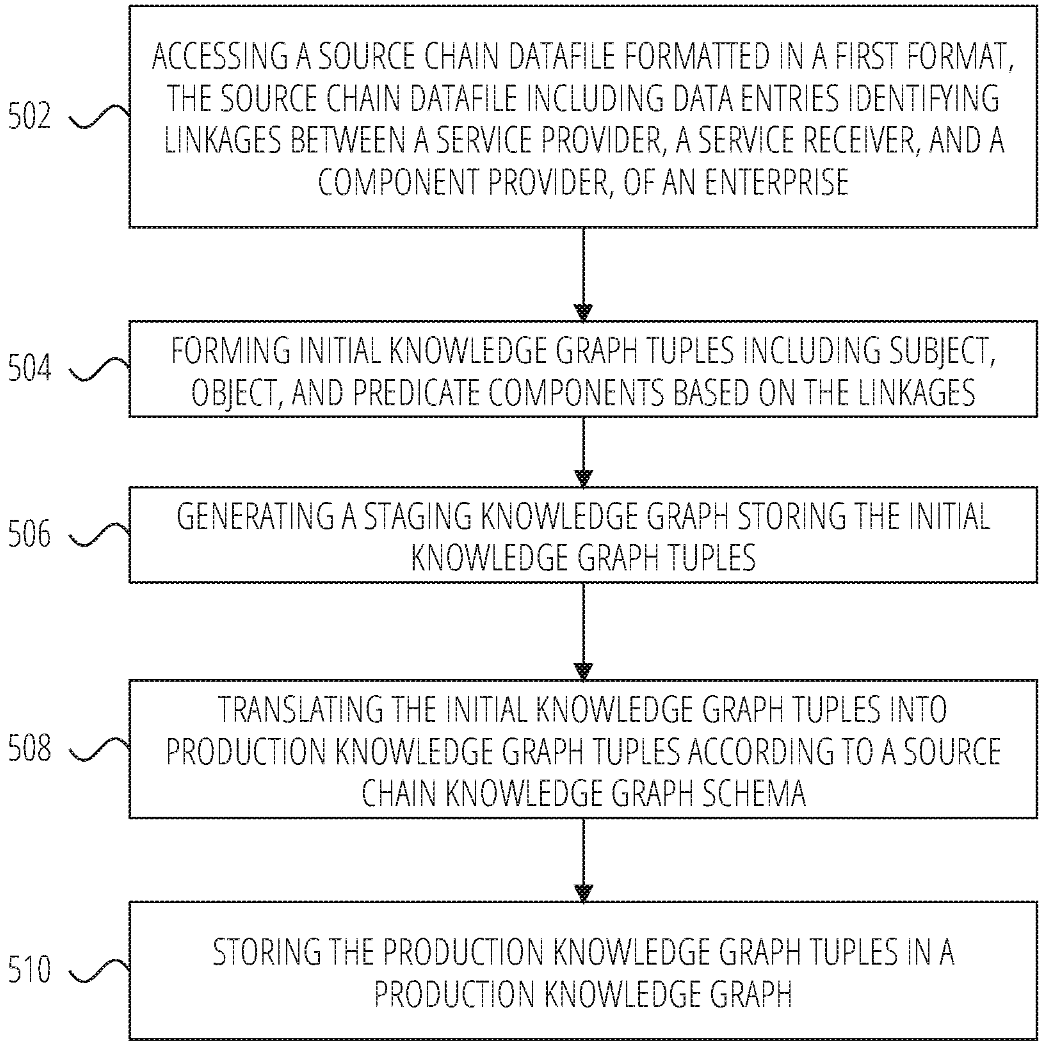
FIG. 5 is a flowchart illustrating a method to generate a knowledge graph, according to various examples.

FIG. 5 is a flowchart illustrating a method to generate a knowledge graph, according to various examples. The method is represented as a set of blocks that describe operations 502-510. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, at operation 502, the method may include accessing a source chain datafile formatted in a first format. The source chain datafile may include data entries identifying linkages between a service provider, a service receiver, and a component provider, of an enterprise. For example, a processing system of a device such as knowledge graph application server 302 may access a data store which contains the source chain datafile or request it via an API call to another device. The source chain datafile may be an input data source such as discussed with respect to input data sources 414. The first format may a spreadsheet document format (e.g., .XLS) having columns and rows. In various examples, the linkages may be explicit in the source chain datafile such as by including identifiers of the service provider, service receiver, and component provider in the same row.

In various examples, at operation 504, the method may include forming initial knowledge graph tuples including subject, object, and predicate components based on the linkages. For example, an extraction algorithm such as XLS2RDF may be used to generate the triples thereby generating a plurality of initial knowledge graph tuples from a row in the source chain datafile. The initial knowledge graph tuples may adhere to a knowledge graph schema based on column headings in the source chain datafile. Forming the initial knowledge graph tuples may be performed as discussed with respect to ingestion operation 404 in FIG. 4 according to various examples.

In various examples, at operation 506, the method may include generating a staging knowledge graph storing the initial knowledge graph tuples. The staging knowledge graph may conform to the knowledge graph schema of operation 404, in various examples. For example, the staging knowledge graph may be a knowledge graph such as raw chain source graph 418 as discussed with respect to FIG. 4.

In various examples, at operation 508, the method may include translating the initial knowledge graph tuples into production knowledge graph tuples according to a source chain knowledge graph schema. For example, the source chain knowledge graph schema may a schema based on chain source ontology 416. Translating may include executing scripts such as discussed with respect to curate graph operation 406. In various examples, the source chain knowledge graph schema inherits and extends a second knowledge graph data schema. For example, the second knowledge graph data schema may be an industry standard ontology. Translating the initial knowledge graph tuples into production knowledge graph tuples according to a source chain knowledge graph schema may include using a resource description framework to resource description framework process.

In various examples, at operation 510, the method may include storing the production knowledge graph tuples in a production knowledge graph. For example, the production knowledge graph may be a graph such as curated chain source graph 420. The production knowledge graph may conform to the source chain knowledge graph schema.

In various examples, the production knowledge graph may be updated periodically using new source chain datafiles. For example, every quarter a source chain datafile may be generated which is then used in a similar manner as the source chain datafile discussed in operation 502. Accordingly, certain services that did not exist in the initial production knowledge graph may be added as tuples, and other existing services may be updated (e.g., perhaps a service receiver now receives that service). As time progresses, instead of using source chain datafiles, direct updates may be made to the production knowledge graph using SPARQL Protocol and RDF Query Language (SPARQL) queries or other graph database language.

Additionally, metrics may be generated stored with respect to the production knowledge graph. For example, there may be characteristic metrics that tracks the number of distinct services, active services, retiring services, emerging services, service providers, service receivers, and component providers.

One such metric may be a criticality metric. For example, one of the columns in the input data sources 414 may indicate whether a service is critical (e.g., yes or no). Another column may indicate whether a service receiver or service provider is a material entity (e.g., yes or no). An enterprise may wish to ensure that if a service is critical it is matched with a material entity or the reverse. Accordingly, the criticality metric may identify the number of mismatches between services that are critical and service receivers or service providers that are material (e.g., one yes and one no).

In various examples, a material entity in the input data sources 414 may be one that has been identified as having one or more of the following characteristics: contributes to critical operations, provisions critical services, significance to global treasury, involvement in derivatives and trading, interaction with material financial market utility. Furthermore, enterprises may file regulatory documents that identify these material entities.

Another metric may be a centrality metric. As discussed above various entities may be considered material. However, the designation in the input data sources 414 may be just one way to consider materiality. A centrality metric (e.g., degree, closeness, betweenness, Eigenvector, etc.) may be used to infer those entities that are material. Accordingly, the entities in the production knowledge graph that have the highest centrality value may be used as a proxy for materiality. In various examples, another metric may be a regulatory mismatch metric that compares the material entities in a regulatory filing to the top (e.g., 15) entities according to the centrality metric.

A user may view one or more of the metrics in a dashboard interface (e.g., provided by web server 310). The dashboard may include graphs such as a pie chart that presents the numbers of services and their status (e.g., retired, active) based on the characteristic metrics. Another portion of the dashboard may include a data that presents the top (e.g., 10 or 15) entities according to a centrality metric.

The dashboard may also include user interface elements to select and compare two different time periods. For example, there may be multiple source chain datafiles, each with an associated time period (e.g., January of 2022, multiple months, etc.). Accordingly, the source chain datafile of operation 502 may be a first source chain datafile associated with a first period of time. The method may further include ingesting a second source chain datafile associated with a second period of time into the production knowledge graph, the second period of time occurring before the first period of time. The various metrics described above may be calculated and stored for each time period. For example, different versions of the production knowledge graph may be stored—each associated with a different time period—and then the metrics may be calculated for each respective knowledge graph.

The method may further includes executing, using the processing, a first data quality review on tuples in production knowledge graph originating from the first source chain datafile and the second source chain datafile. The data quality review may include calculation of the metrics above. The method may further include executing, using the processing, a second data quality review on tuples in production knowledge graph originating from the second source chain datafile. The method may then include presenting a user interface on a computing device, including a visualization of a change between a result of the first data quality review and the second data quality review. For example, the visualization as described above with respect to the dashboard. The changes may be presented in several ways. For example, on the left-hand side of the dashboard a pie chart of the characteristic metrics for the first quality data review and on the right-hand side a pie chart of the characteristic metrics for the second data quality review. The method may also include where the first data quality review and second data quality review measure a number of mismatches between service receivers designated as critical and non-material service providers.

Users may interface with a production knowledge graph—production knowledge graph 330—in several manners. For example, a user may search for object types that are stored in the production knowledge graph such as service receivers, service providers, component objects, licensed applications, etc. The results of the search may be presented as nodes and links between nodes in a graph presentation area on a display device of a client device (e.g., via web client 306). Depending on the type of object, the hierarchy of the results may differ. For example, if a service provider is searched, the head node of a presented graph may be a service provider and the relationships with child nodes may be described with respect to the service provider. If a component object is searched, the component may be the head node and the relationships with child nodes may be described with respect to the component.

Figure 6:
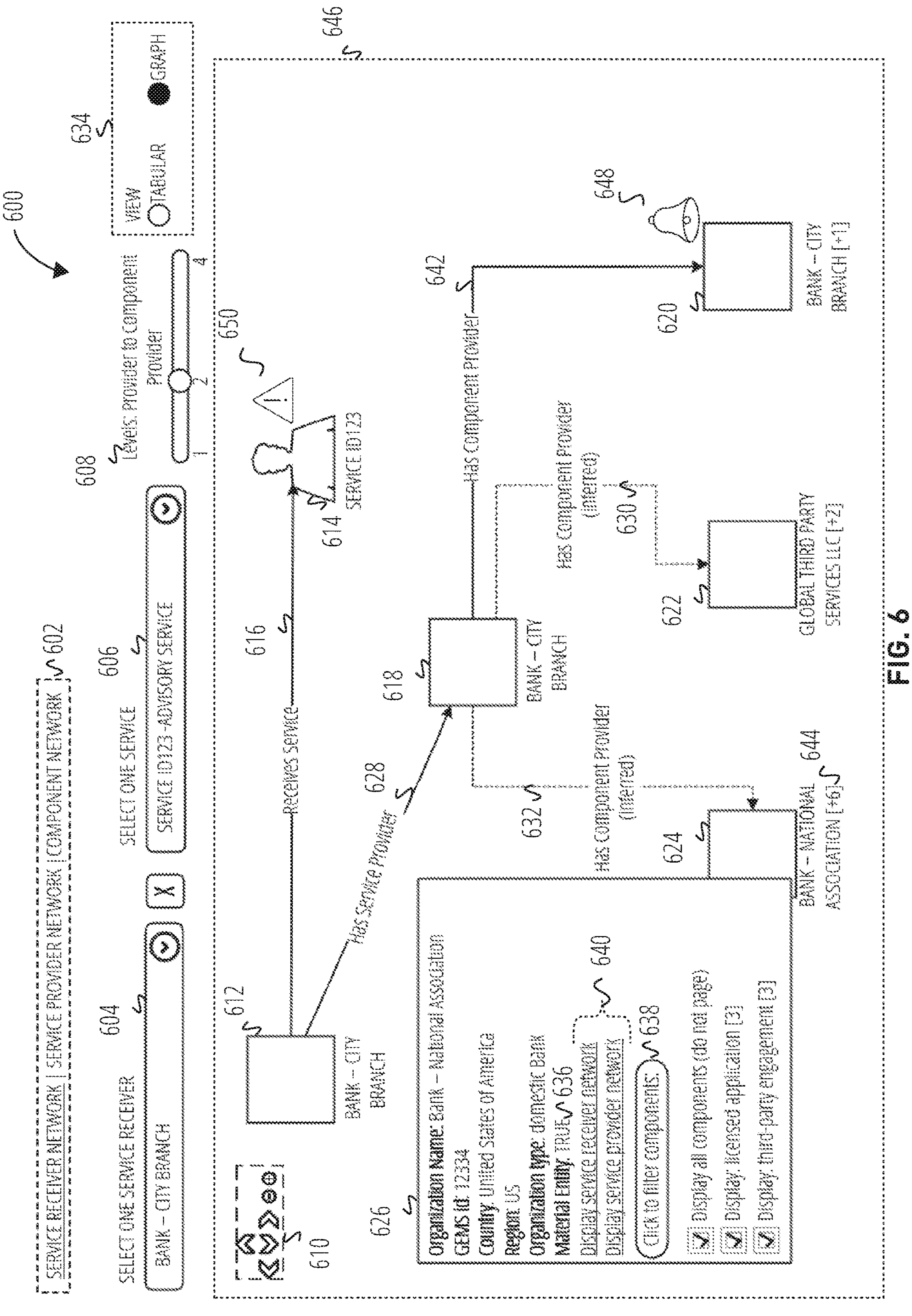
FIG. 6 is a graph visualization user interface, according to various examples.

FIG. 6 is a graph visualization user interface, according to various examples. The knowledge graph visualization interface 600 comprises a network graph selection type 602, a service receiver input element 604, a service identifier input element 606, a level selection input element 608, a graph controls 610, a service receiver object 612, a service object 614, a link 616, a service provider object 618, a component object 620, a component object 622, a component object 624, an object information pane 626, a link 628, a link 630, a link 632, a graph layout selection element 634 a material status 636, a display filter options 638, a graph network graph selection type element 640, a link 642, a child object metric 644, graph presentation area 646, non-material icon 648, and criticality icon 650.

Network graph selection type 602 may include identifiers of some of the different types of graphs that may be presented in graph presentation area 646. The types of graphs may use the same underlying knowledge graph in various examples, such as production knowledge graph 330. The type of graph may refer to the perspective on which the graph is visualized in graph presentation area 646 and what input elements are presented. For example, the underlining under "Service Receiver Network" in network graph selection type 602 indicates that the interface is currently configured to search for a service receiver. A user may select another graph type to be taken to a search interface for that type of graph as discussed in more detail below.

Service receiver input element 604 may be configured to receive an input string from a user for a legal name of a service receiver. After the input string is entered, search component 328 may be used to execute a query to production knowledge graph 330 to find matching service receivers using literal string matching, fuzzy matching, similar matching using Levenshtein distance, etc. This query—and others described herein—may be made using SPARQL queries or other graph database language. Then, service receiver input element 604 may be populated (e.g., in a drop-down menu) of the top 10 (or other number) matched service receiver objects. In the instance of FIG. 6, the "Bank—City Brach" legal identifier has been selected.

After the service receiver has been selected in the service receiver input element 604, a subsequent query may be executed to production knowledge graph for services that are provided to the service receiver. Based on the results, service identifier input element 606 may be populated with service identifier objects and one may be selected. In the example of FIG. 6, the service identifier "Service ID123" has been selected. After both a service receiver and service have been selected in the FIG. 6, another query may made to production knowledge graph 330 for objects in the source chain of the service receiver with respect to the selected service.

The number of objects retrieved may be based on level selection input element 608. Level selection input element 608 may be a slider or drop-down menu labeled with entity types in the chain source ontology that are currently displayed. The labels used in level selection input element 608 may be further based on the type of graph selected in network graph selection type 602. For example, because the current graph is the service receiver network, and the level is at a '2' the label indicates that the presented graph includes the service providers to the component providers. If the slider was at '1', the graph may only display the service provider, a level '3' may include subcomponents of the component providers, as an example.

With respect to the graph in FIG. 6, the query may result in retrieval of the service identifier object (as selected in service identifier input element 606), the service receiver selected in service receiver input element 604, a service provider of the selected service and the service providers associated component providers. Visual graph generation component 326 may then generate a graph using the retrieved objects.

The graph may be presented in several manners. Separately from the graph type in network graph selection type 602, a user may select visualization and layout options. For example, graph layout selection element 634 identifies an option to use a tabular view of the results instead of a graph. Other visualization options beyond level selection input element 608 may include, but are not limited to, a radial or hierarchical graph option, zoom and panning controls (e.g., graph controls 610), turning on or off edge labels between nodes. Different graph visualization platforms may be used to generate the objects in graph presentation area 646 (e.g., Neo4j Bloom or Gephi).

Although most of the objects in graph presentation area 646 are visually depicted as boxes, different types of objects may be presented using different icons. For example, legal entities that are banks may be represented as one type of icon, applications may be presented as another, countries may be represented by their national flags, etc.

Specifically with respect to FIG. 6, service object 614 may represent the selected service identifier input element 606 and service receiver object 612 may represent the service receiver selected in service receiver input element 604. Link 616 (also referred to as an edge) is labeled according to the property relationship between service receiver object 612 and service object 614 in production knowledge graph 330, in various examples. Similarly, link 628 is labeled according to the property relationship between service receiver object 612 and service provider object 618.

There may be a one-to-many relationship between service provider object 618 and component providers (e.g., component object 620, component object 622, and component object 624) with links 630, 632, and 634. As seen, the style of the links may differ depending on the relationship as well. For example, link 632 and link 630 are both labeled as having been inferred. Other styles may be used as well, such as color, line thickness, etc. The inferred label may be stored as part of production knowledge graph as a property. For example, service provider object 618 may have a "is inferred component provider" property with respect to component object 624. A link may be inferred as part of curate graph operation 406. For example, as multiple data sources are input over a period of times, if a link existed (e.g., had a spreadsheet row) in one but not that other the link may be inferred for the data source that does not have the link.

A user may interact with the objects in graph presentation area 646 in several manners. For example, a user may move the objects by performing a click-hold-drag operation using an input device such as a mouse or a finger when using a touch-enabled display device. As a user moves an object, the edges connecting the object may move as well.

Another interaction may involve a click or hover operation on an object. In response to such an interaction, an information pane may be presented overlaid in the graph presentation area. For example, object information pane 626 may be presented in response to a cursor hovering over (e.g., for at least a threshold amount of time) component object 624. Object information pane 626 may include values of properties of the object. In this instance, object information pane 626 includes values for the organization name, Global Electronic Messaging System (GEMS) id, country, organization type, and material status 636.

FIG. 6 further includes child object metric 644 that indicates the number of non-displayed entities at the next level in the knowledge graph. For example, in the context of component object 624 there are six identifies child objects. A user may activate (e.g., click) child object metric 644 to expand the graph to include the child objects of component object 624. Due to the size and complexity of large knowledge graphs—and the limited amount of display device screen size—a user may not wish to have all object displayed at once. Or a user may only need to see a certain category of child objects.

In the above scenarios, a user may use display filter options 638 to select or deselect different categories of child objects. For example, object information pane 626 shows that there are three "licensed application" type child objects and three "third-party engagement" child objects. In various examples, visual graph generation component 326 may execute a query to production knowledge graph 330 to determine the types and numbers of each type of child object. The results may be displayed under the display filter options 638. If a user deselects the license application check and activates display filter options 638, only the three third-party engagement objects may be added to graph presentation area 646, for example.

Knowledge graph application server 302 may store a number of graph types. As part of this storage, a graph type may include configuration data and presentation data for the graph type. The configuration data may identify the object types at each level of the graph and queries to execute to retrieve. For example, for a service receiver network such as displayed in graph presentation area 646, the configuration data may identify the head node as a legal entity that receives a service, a second level being a service provider, and a subsequent level being component providers. Accordingly, when a service receiver network search is requested, a SPARQL may be executed that retrieves a service provider for the service received by the head node and component providers of the service provider. The presentation data may include what icons to use for which types of objects, the style (e.g., color, thickness, solid, dotted, etc.) of the links between objects.

There may be several other types of graph types such as service provider network, a component network, a service network, and a cost network. The number of levels and included objects in each discussed below are examples and others may be used. The configuration data of a service provider network graph type may identify a service provider legal entity as the head nodes with child nodes of service receives and component providers. A user may then expand the service provider network by clicking either of those child nodes to display service receivers and component providers, respectively.

The configuration data for a component network graph type may use a legal entity of a component provider as the head node, a service provider object that uses the component provider at the second level, service identifiers received at a third level, regions (e.g., geographic regions) at a fourth level, and those entities that use the service in the region in a fifth level. A service network graph type may use a service identifier at the head node, a legal entity object at the second level, and service relationships and components at a third level. The child nodes of the components may be personnel costs objects (e.g., used to calculate the amount of work units a service needs or uses). A cost network may use a personnel cost object as the head node with services associated with the cost object at a second level.

The configuration data may also indicate what search fields are presented. For example, for the service receiver network, there may be a service receiver input element and a service identifier input element 606. For a service provider network type, there may be a service provider input element and service identifier input element 606. A component graph type may have a single input element for the component name.

With reference back to object information pane 626—in addition to be able to view child objects—a user may have visual graph generation component 326 regenerate the graph displayed in graph presentation area 646. For example, object information pane 626 includes graph network graph selection type element 640. When a user selects one of the network graph types, graph presentation area 646 may be regenerated with component object 624 being the head node—which in FIG. 6 is service receiver object 612—with the selected network graph.

Different objects may have different information and graph types selectable in an object information pane. For example, if a component is hovered over, an information pane (not displayed in FIG. 6) may be presented that includes an option to present a component network graph type. If a service object is hovered over (e.g., service object 614), an option may be presented to switch to a service graph type with service object 614 as the head node.

As discussed above, there may be a variety of options with respect to knowledge graph visualization. One such option may be to include additional graphics next to the main graphic for an object indicating the veracity of logic rules stored with respect to production knowledge graph 330. For example, one such rule may be to evaluate whether service providers and component providers associated with a service are all identified as material if the service has been identified as a critical service.

For example, consider that service object 614 is a critical service. Accordingly, service provider object 618, component object 624, component object 622, and component object 620 should all be material in order to meet the rules requirements. If, however, one of these objects is not identified as material in production knowledge graph 330 additional icons may be presented next to the objects in question. In the case of FIG. 6, component object 620 may not be material. Accordingly, non-material icon 648 may be presented. Furthermore, because now the logic rule is not true, criticality icon 650 may be presented next to service object 614. Thus, a user may quickly ascertain that an investigation is warranted as to why component object 620 is being used for a critical service if it has not been identified as material. In various examples, a user may click on either criticality icon 650 or non-material icon 648 to modify (e.g., make the links bolder, change color, etc.) links in the data path between service object 614 and component object 620. In this manner a user may quickly see any intermediate services or objects that may be impacted as well.

In various examples, not all of the visualization options may be available to each user. For example, some users may not have the correct access controls to be able to see whether or not a service is critical or inferred links. The access controls may be defined according to the role of a user that has logged into knowledge graph application server 302. Thus, knowledge graph application server 302 may use the user identifier to look up in user accounts 320 what access rights are associated with the role of the user—and either disable or hide visualization options that the role does not have rights to.

Figure 7:
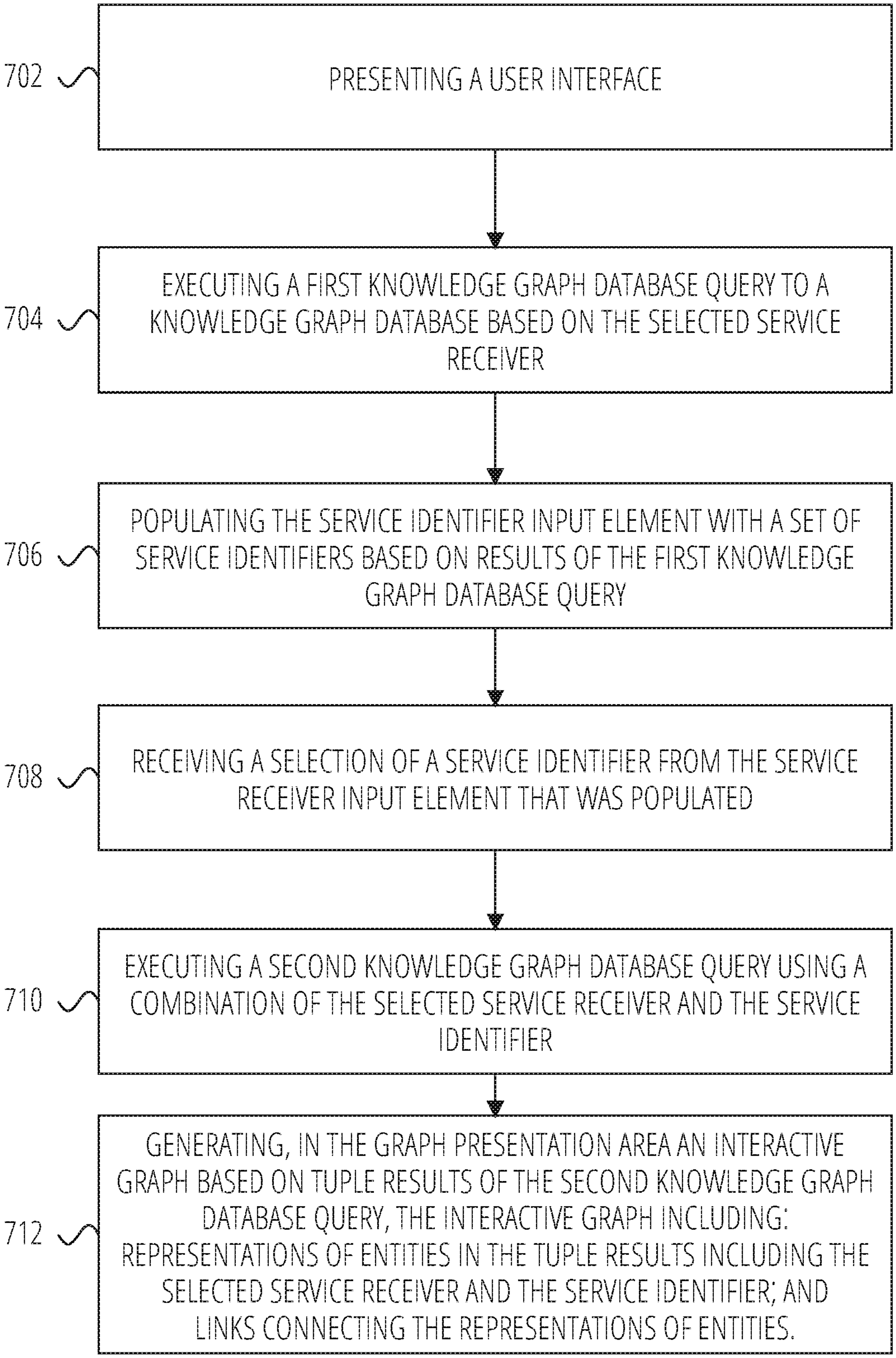
FIG. 7 illustrates an aspect of the subject matter in accordance with one embodiment.

FIG. 7 is a flowchart illustrating a method to generate a visualization of a knowledge graph, according to various examples. The method is represented as a set of blocks that describe operations 702 to 712. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In one aspect, a method includes presenting a user interface (e.g., operation 702), the user interface including a service receiver input element presenting a selected service receiver, a service identifier input element, and a graph presentation area. The method also includes executing a first knowledge graph database query to a knowledge graph database based on the selected service receiver (e.g., operation 704). The method also includes populating the service identifier input element with a set of service identifiers based on results of the first knowledge graph database query (e.g., operation 706). The method also includes receiving a selection of a service identifier from the service receiver input element that was populated (e.g., operation 708). The method also includes executing a second knowledge graph database query using a combination of the selected service receiver and the service identifier. (e.g., operation 710) The method also includes generating, in the graph presentation area an interactive graph based on tuple results of the second knowledge graph database query, the interactive graph including representations of entities in the tuple results including the selected service receiver and the service identifier, and links connecting the representations of entities (e.g., operation 712).

The method may also include where the links connecting the representation of entities includes a link between a representation of the selected service receiver and a representation of the service identifier, the link labeled with a relationship identifier based on the tuple results. Other technical features may be readily apparent to one skilled in the art from the following figures, descriptions, and claims.

The method may also include where the representation of the selected service receiver is depicted as a first type of icon and the representation of the service identifier is depicted as a second type of icon.

The method may also include where the representations of entities include a representation of a service provider and where the links connecting the representation of entities includes a link between the representation of the selected service receiver and the representation of a service provider, the link labeled with a relationship identifier based on the tuple results.

The method may also include where the interactive graph is presented as a hierarchical graph with the representation of the selected service receiver at a first level, the representation of the service provider at a second level, and component service providers at a third level.

The method may also include where the representation of the service provider includes an identification of a number of non-displayed entities at a third level of the interactive graph.

The method may also include further includes receiving an indication of activation of the identification, and in response to receiving the indication, expanding the interactive graph to include the third level of the interactive graph, the third level of interactive graph including a component provider entity.

The method may also include receiving an indication of a cursor interaction with a representation of a component service provide. The method may also include in response to receiving the indication of the cursor interaction, presenting an information pane overlaid on the graph presentation area, the information pane including a material entity status, network graph type change links, and display filter options for child nodes of the component service provider.

The method may also include where the display filter options identify object types of the child nodes of the component service provider and respective numbers of each object type.

Figure 8:
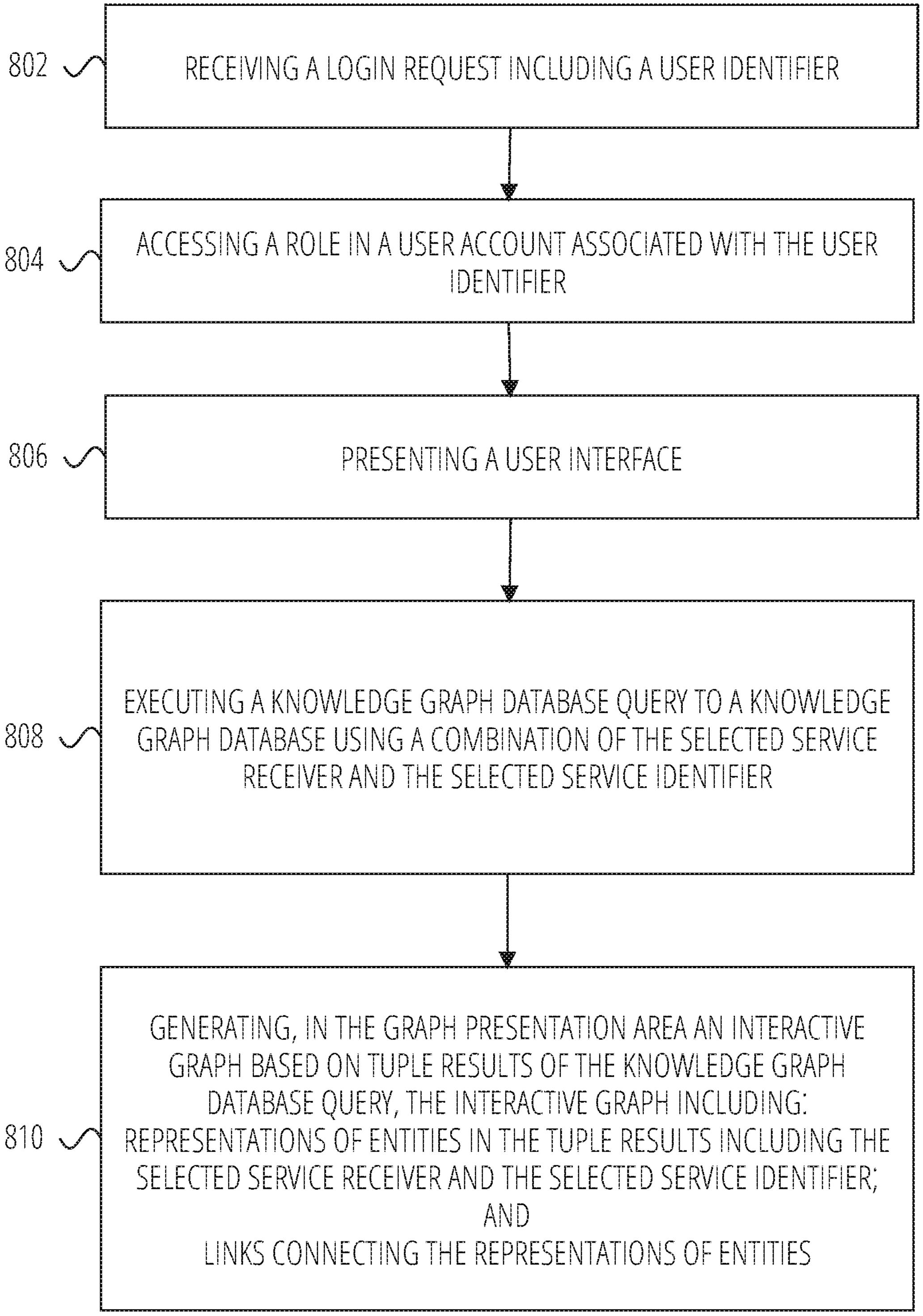
FIG. 8 illustrates an aspect of the subject matter in accordance with one embodiment.

FIG. 8 is a flowchart illustrating a method to generate a knowledge graph, according to various examples. The method is represented as a set of blocks that describe operations 802 to 810. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In one aspect, a method includes receiving a login request including a user identifier (e.g., at operation 802). The method also includes accessing a role in a user account associated with the user identifier (e.g., at operation 804). The method also includes presenting a user interface (e.g., at operation 806), the user interface including a service receiver input element presenting a selected service receiver, a service identifier input element presenting a selected service identifier, a graph presentation area, and graph visualization options based on the role in the user account. The method also includes executing a knowledge graph database query to a knowledge graph database using a combination of the selected service receiver and the selected service identifier (e.g., at operation 808). The method also includes generating, in the graph presentation area an interactive graph based on tuple results of the knowledge graph database query, the interactive graph including representations of entities in the tuple results including the selected service receiver and the selected service identifier, and links connecting the representations of entities (e.g., at operation 810).

The method may also include determining that the role in the user account permits access to inferred links between objects in the knowledge graph database, and based on the determining, including an option to view inferred links in the graph visualization options.

The method may also include determining that the role in the user account permits access to criticality status of services in the knowledge graph database, and based on the determining, including an option to view criticality status of services in the graph visualization options. Other technical features may be readily apparent to one skilled in the art from the following figures, descriptions, and claims.

The method may also include receiving an indication that the option to view inferred links has been activated, and in response to receiving the indication, displaying in the graph presentation area, a first style of a link between representations of entities for inferred links and a second style of link between representations of entities for direct links.

The method may also include receiving an indication that the option to view criticality status of services has been activated, and in response to receiving the indication, presenting a first type of icon in the graph presentation area by a representation of a service identifier object.

The method may also include determining that a service provider associated with the service identifier object is identified as non-material in the knowledge graph database, and in response to determining that the service provider associated with the service identifier object is identified as non-material, presenting a second type of icon by a representation of the service provider in the graph presentation area.

The method may also include receiving an indication of activation of the first type of icon, and in response to receiving the indication, modifying a style of link between the representation of the service provider and the representation of the service identifier object. Other technical features may be readily apparent to one skilled in the art from the following figures, descriptions, and claims.

Figure 9:
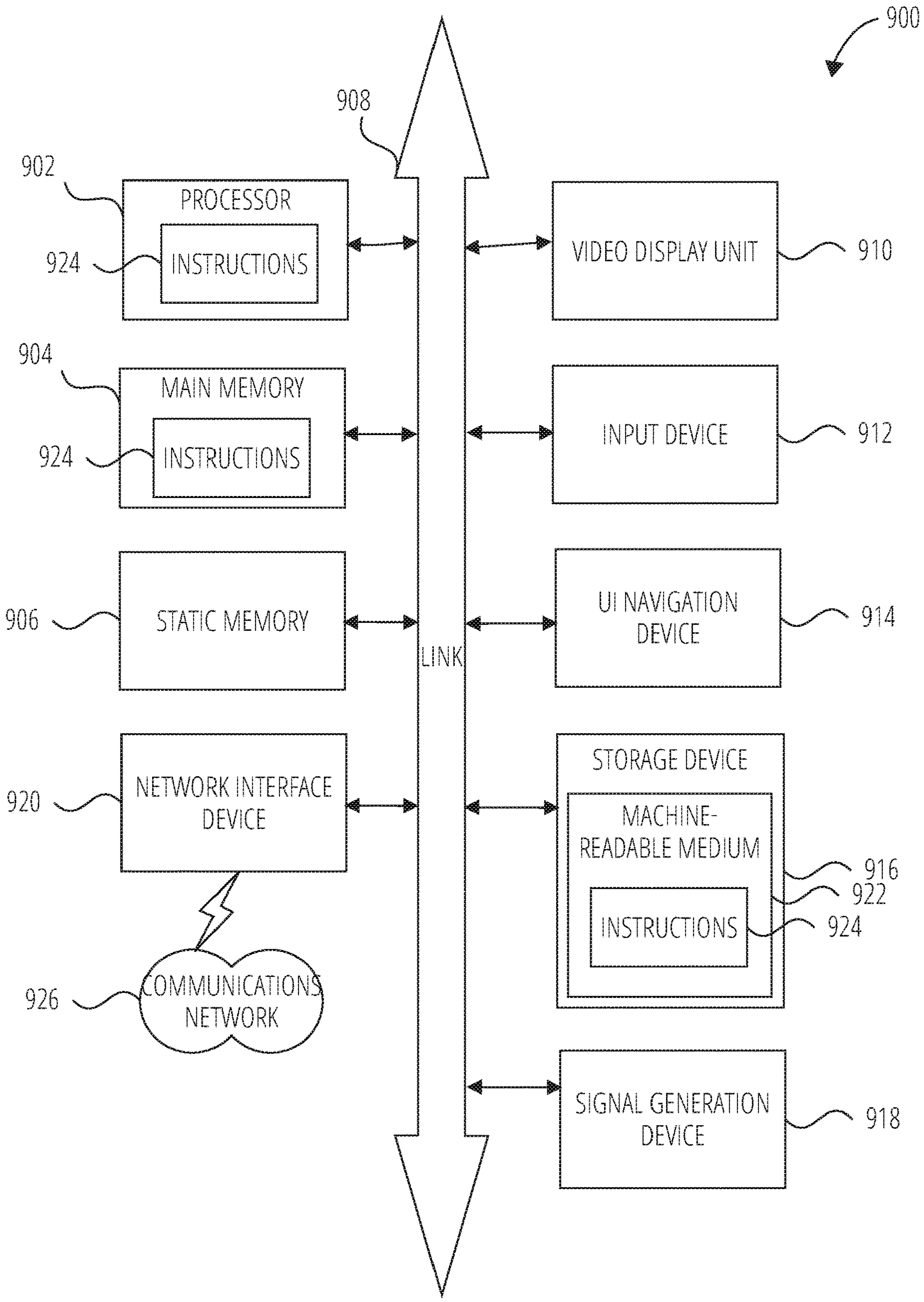
FIG. 9 is a block diagram illustrating a machine in the example form of computer system, within which a set or sequence of instructions may be executed to cause the machine to perform any one of the methodologies discussed herein, according to various examples.

FIG. 9 is a block diagram illustrating a machine in the example form of computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908. The computer system 900 may further include a video display unit 910, an input device 912 (e.g., a keyboard), and a user interface (UI) navigation device 914 (e.g., a mouse). In one embodiment, the video display unit 910, input device 912, and UI navigation device 914 are incorporated into a single device housing such as a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensors.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed Database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 922 that excluded transitory signals.

The instructions 924 may further be transmitted or received over a communications network 926 using a transmission medium via the network interface device 920 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:

receiving a login request including a user identifier;

presenting a user interface, the user interface including:

a service receiver input element presenting a selected service receiver;

a service identifier input element presenting a selected service identifier;

a graph presentation area; and graph visualization options;

executing a search in a user account associated with the user identifier to identify a role for the user identifier;

determining that the role has access to an inferred links visualization option of the graph visualization options;

in response to the determination, enabling the inferred links visualization option;

executing a knowledge graph database query to a knowledge graph database using a combination of the selected service receiver and the selected service identifier;

generating, in the graph presentation area an interactive graph based on tuple results of the knowledge graph database query, the interactive graph including:

representations of entities in the tuple results including the selected service receiver and the selected service identifier; and links connecting the representations of entities;

in response to a cursor interaction with a representation of an entity in the interactive graph, presenting an pane overlaid on the graph presentation area, the pane including property values of the entity retrieved from the knowledge graph database and an identification of a number of non-displayed child entities at a next level in the knowledge graph database;

receiving an indication of activation of the identification of the number of non-displayed child entities;

in response to receiving the indication of activation, expanding the interactive graph to include the non-displayed child entities at the next level;

receiving an indication that the inferred links visualization option has been activated; and in response to receiving the indication, updating the graph presentation area to present a first style of a link between representations of entities for inferred links and a second style of link between representations of entities for direct links.

2. The method of claim 1, further comprising:

determining that the role in the user account permits access to criticality status of services in the knowledge graph database; and based on the determining, including an option to view criticality status of services in the graph visualization options.

3. The method of claim 2, further comprising:

receiving an indication that the option to view criticality status of services has been activated; and in response to receiving the indication, presenting a first type of icon in the graph presentation area by a representation of a service identifier object.

4. The method of claim 3, further comprising:

determining that a service provider associated with the service identifier object is identified as non-material in the knowledge graph database; and in response to determining that the service provider associated with the service identifier object is identified as non-material, presenting a second type of icon by a representation of the service provider in the graph presentation area.

5. The method of claim 4, further comprising:

receiving an indication of activation of the first type of icon; and in response to receiving the indication, modifying a style of link between the representation of the service provider and the representation of the service identifier object.

6. A non-transitory computer-readable medium comprising instructions which when executed by a processing unit, configure the processing unit to perform operations comprising:

receiving a login request including a user identifier;

presenting a user interface, the user interface including:

a service receiver input element presenting a selected service receiver;

a service identifier input element presenting a selected service identifier;

a graph presentation area; and graph visualization options;

executing a search in a user account associated with the user identifier to identify a role for the user identifier;

determining that the role has access to an inferred links visualization option of the graph visualization options;

in response to the determination, enabling the inferred links visualization option;

executing a knowledge graph database query to a knowledge graph database using a combination of the selected service receiver and the selected service identifier;

generating, in the graph presentation area an interactive graph based on tuple results of the knowledge graph database query, the interactive graph including:

representations of entities in the tuple results including the selected service receiver and the selected service identifier; and links connecting the representations of entities;

in response to a cursor interaction with a representation of an entity in the interactive graph presenting an pane overlaid on the graph presentation area, the pane including property values of the entity retrieved from the knowledge graph database and an identification of a number of non-displayed child entities at a next level in the knowledge graph database;

receiving an indication of activation of the identification of the number of non-displayed child entities;

in response to receiving the indication of activation, expanding the interactive graph to include the non-displayed child entities at the next level;

receiving an indication that the inferred links visualization option has been activated; and in response to receiving the indication, updating the graph presentation area to present a first style of a link between representations of entities for inferred links and a second style of link between representations of entities for direct links.

7. The non-transitory computer-readable medium of claim 6, wherein the instructions, which when executed by the processing unit, further configure the processing unit to perform operations comprising:

determining that the role in the user account permits access to criticality status of services in the knowledge graph database; and based on the determining, including an option to view criticality status of services in the graph visualization options.

8. The non-transitory computer-readable medium of claim 7, wherein the instructions, which when executed by the processing unit, further configure the processing unit to perform operations comprising:

receiving an indication that the option to view criticality status of services has been activated; and in response to receiving the indication, presenting a first type of icon in the graph presentation area by a representation of a service identifier object.

9. The non-transitory computer-readable medium of claim 8, wherein the instructions, which when executed by the processing unit, further configure the processing unit to perform operations comprising:

determining that a service provider associated with the service identifier object is identified as non-material in the knowledge graph database; and in response to determining that the service provider associated with the service identifier object is identified as non-material, presenting a second type of icon by a representation of the service provider in the graph presentation area.

10. The non-transitory computer-readable medium of claim 9, wherein the instructions, which when executed by the processing unit, further configure the processing unit to perform operations comprising:

receiving an indication of activation of the first type of icon; and in response to receiving the indication, modifying a style of link between the representation of the service provider and the representation of the service identifier object.

11. A system comprising:

a processing unit; and a storage device comprising instructions, which when executed by the processing unit, configure the processing unit to perform operations comprising:

receiving a login request including a user identifier;

presenting a user interface, the user interface including:

a service receiver input element presenting a selected service receiver;

a service identifier input element presenting a selected service identifier;

a graph presentation area; and graph visualization options;

executing a search in a user account associated with the user identifier to identify a role for the user identifier;

determining that the role has access to an inferred links visualization option of the graph visualization options;

in response to the determination, enabling the inferred links visualization option;

executing a knowledge graph database query to a knowledge graph database using a combination of the selected service receiver and the selected service identifier;

generating, in the graph presentation area an interactive graph based on tuple results of the knowledge graph database query, the interactive graph including:

representations of entities in the tuple results including the selected service receiver and the selected service identifier; and links connecting the representations of entities;

in response to a cursor interaction with a representation of an entity in the interactive graph, presenting an pane overlaid on the graph presentation area, the pane including property values of the entity retrieved from the knowledge graph database and an identification of a number of non-displayed child entities at a next level in the knowledge graph database;

receiving an indication of activation of the identification of the number of non-displayed child entities;

in response to receiving the indication of activation, expanding the interactive graph to include the non-displayed child entities at the next level;

receiving an indication that the inferred links visualization option has been activated; and in response to receiving the indication, updating the graph presentation area to present a first style of a link between representations of entities for inferred links and a second style of link between representations of entities for direct links.

12. The system of claim 11, wherein the instructions, which when executed by the processing unit, further configure the processing unit to perform operations comprising:

determining that the role in the user account permits access to criticality status of services in the knowledge graph database; and based on the determining, including an option to view criticality status of services in the graph visualization options.

13. The system of claim 12, wherein the instructions, which when executed by the processing unit, further configure the processing unit to perform operations comprising:

receiving an indication that the option to view criticality status of services has been activated; and in response to receiving the indication, presenting a first type of icon in the graph presentation area by a representation of a service identifier object.

14. The system of claim 13, wherein the instructions, which when executed by the processing unit, further configure the processing unit to perform operations comprising:

determining that a service provider associated with the service identifier object is identified as non-material in the knowledge graph database; and in response to determining that the service provider associated with the service identifier object is identified as non-material, presenting a second type of icon by a representation of the service provider in the graph presentation area.

* * * * *